United States Patent [19]

Carlson et al.

[11] Patent Number: 4,495,549
[45] Date of Patent: Jan. 22, 1985

[54] INFRARED RADIATION FILTER LENS FOR AIRCRAFT LIGHTS

[75] Inventors: Albert A. Carlson; Darrel M. Owen, both of Seattle; George W. Van Winkle, Bellevue, all of Wash.

[73] Assignee: The Boeing Company, Seattle, Wash.

[21] Appl. No.: 425,428

[22] Filed: Sep. 28, 1982

[51] Int. Cl.³ ............................................... B64F 1/20
[52] U.S. Cl. ....................................... 362/62; 362/96; 362/101; 362/293; 362/318; 350/312; 244/129.3
[58] Field of Search ............... 362/96, 101, 62, 318, 362/293; 350/312; 244/129.3

[56] References Cited

U.S. PATENT DOCUMENTS

| Re. 22,497 | 6/1944 | Adler, Jr. | 362/62 X |
| 2,904,672 | 9/1959 | Fisher | 350/312 X |
| 3,424,515 | 1/1969 | Risk | 350/312 X |
| 3,492,062 | 1/1970 | Hoover | 350/312 X |
| 3,914,010 | 10/1975 | Zeller | 350/312 X |
| 4,071,912 | 2/1978 | Budmiger | 350/392 X |
| 4,260,225 | 4/1981 | Walles | 350/312 X |

Primary Examiner—Peter A. Nelson
Attorney, Agent, or Firm—Hughes, Barnard & Cassidy

[57] ABSTRACT

An infrared radiation filter lens for aircraft lights is comprised of a heat-conductive filter frame disposed in heat-exchange relationship with an aircraft frame and/or its skin to dissipate heat in the filter frame to the aircraft body and the ambient; first and second window panels secured peripherally about longitudinal and transverse side edges by the filter frame in laterally spaced, generally conforming relationship defining a fluid cell therebetween; a fluid, infrared radiation filtration medium disposed for convective circulation within the fluid cell; and baffle members inwardly proximate the transverse side edges of the cell for deflecting convective circulation of the fluid along those sides of the frame. A method for infrared radiation filtration of aircraft lights is also disclosed herein.

2 Claims, 7 Drawing Figures

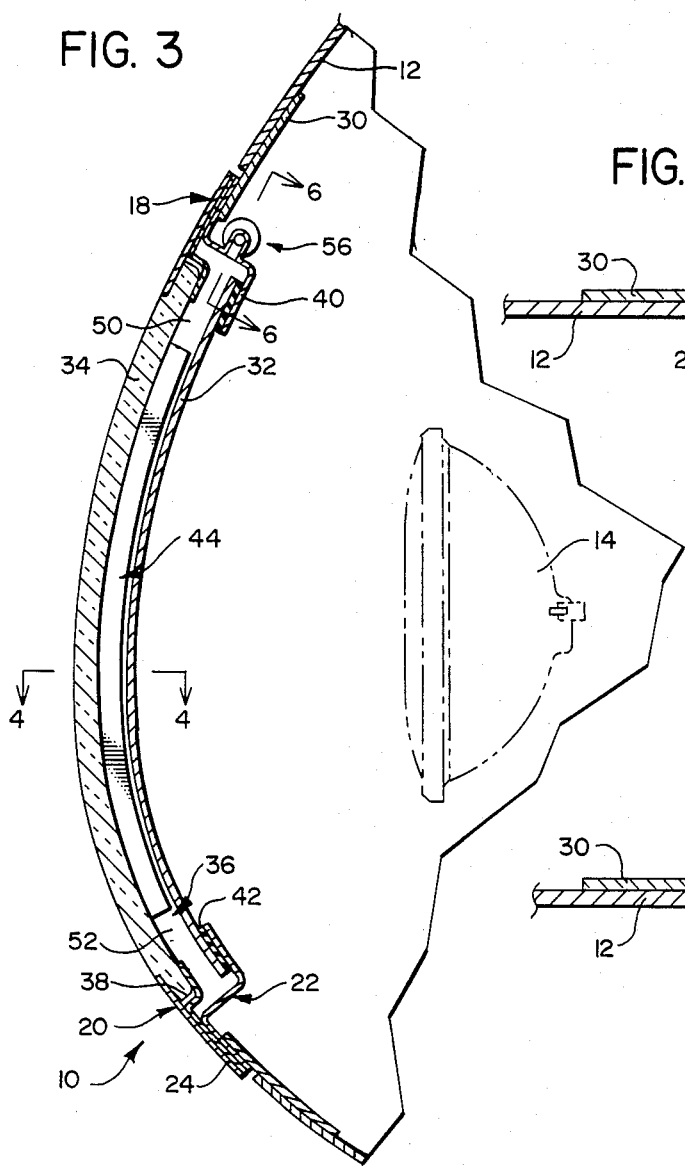
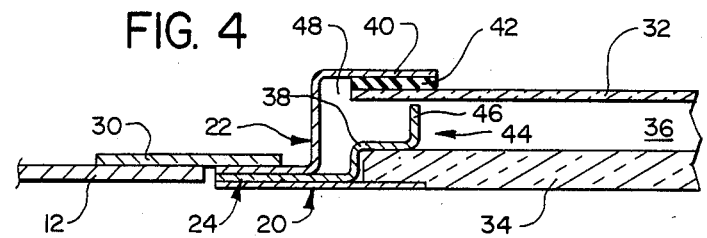
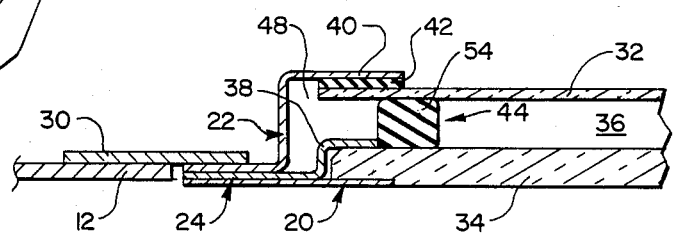
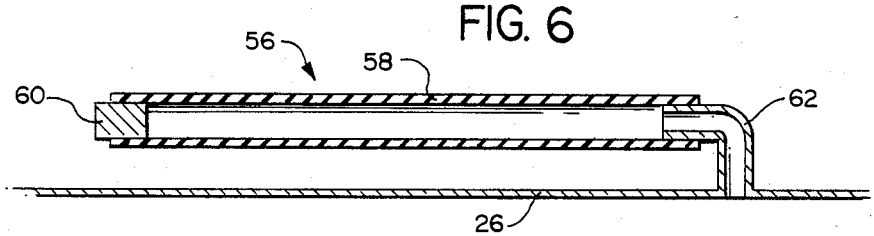

INFRARED RADIATION FILTER LENS FOR AIRCRAFT LIGHTS

GOVERNMENT RIGHTS

The Government has rights in this invention pursuant to Contract No. F19628-80-C-0051 awarded by the U.S. Air Force.

BACKGROUND OF THE INVENTION

1. Field of the Invention

The present invention relates, generally, to means for suppressing infrared radiation emanating from an aircraft, more particularly to infrared radiation filter lenses for suppressing such radiation, and most especially to such filter lenses for suppressing the infrared radiation otherwise emitted from aircraft lights such as landing lights and taxi lights.

2. The Problem to be Solved

Modern aircraft have myriad sources of infrared radiation; i.e., devices which, in operation, emit radiation extending into the infrared portion of the spectrum. The principal infrared sources are lights and the aircraft engines themselves. Many weapon systems are designed to take advantage of these characteristics; the so-called "heat seeking" missiles tracking hot spots on an aircraft by homing in the infrared portion of the spectrum during flight. From an aft aspect, the engines present a principal infrared radiation source for tracking, whereas the forward aspect features more prominently the aircraft lights such as the taxi and landing lights.

Very complex electronic countermeasure devices have been developed with an eye toward neutralizing the ability to home on the infrared sources in an aircraft. As might be expected, the complexity of these sophisticated systems gives rise to a significant cost factor. As respects the need to protect the aircraft against a successful attack, these costs are justifiable given the current state of the art in relation to the infrared radiation emitted from engine sources. The need to find other viable approaches respecting the suppression of infrared radiation from aircraft lights, with an eye toward a less costly solution, led to the development of the instant invention—one employing radiation filters.

DESCRIPTION OF THE BACKGROUND ART

Others have proposed various types of filters for either the suppression of infrared radiation or the selective removal of infrared from a source having a broader (visible) spectrum. The objectives have ranged from the desire to provide therapeutic radiation asserted to be beneficial in the treatment of certain human disorders, to the protection of photographic film during projection, to the improvement in the characteristics of automotive headlights. One approach in the prior art is to employ a fluid through which, e.g., visible light is projected for the removal of the infrared portion thereof. There are other suggestions, for instance the use of specific filter media such as dichroic coatings, for that purpose; but those warrant no detailed consideration as respects the present invention as it too uses the concept of fluid filter media.

U.S. Pat. Nos. 2,114,174 and 2,380,682, both to Boerstler, typify one suggested approach for the filtration of a fairly broad spectrum source of radiation, inter alia, to remove the infrared components thereof. Boerstler suggests the therapeutic value of radiation; noting the benefits in the treatment of various disorders by exposure to visible light. Infrared is removed in order to permit prolonged exposure without the related discomfort of heating. U.S. Pat. No. 2,380,682 describes a device for filtering the infrared by means of a fluid cell defined between light-transmissive panels. In certain aspects of the invention, the fluid employed for filtering the infrared is a combination of water with an adjuvant to improve its thermal characteristics, ethylene glycol being a preferred adjuvant as it is benign as respects the filtration of the desirable portion of the spectrum. The patent continues with the suggestion to provide an expansion chamber communicating with the filter cell in order to assure that the liquid at all times fills it regardless of the angle at which the cell is held.

U.S. Pat. No. 4,068,918 shares some conceptual similarity insofar as it discloses a device for personal health care based upon the filtration of radiation by means of a fluid cell. That patent is concerned with a type of eye-protection device in the nature of goggles to be worn while sun bathing. A pair of flexible, liquid-filled lenses are utilized in order to "cool" the sunlight which would otherwise fall on the eyes of the sun bather. Water is the fluid filter of choice.

Optical instruments also make use of fluid cells to good advantage. For example, U.S. Pat. No. 1,565,590 discloses a method and an apparatus for projecting "cool" light by the interposition of a fluid cell in the light path from a lamp. The fluid is circulated in order to extract and dissipate heat. Cf., U.S. Pat. No. 3,620,594; disclosing an optical stabilizer which includes a lens buoyantly supported in a transparent fluid bath along the optical path of the system.

A vast array of approaches has been suggested in the prior art for lenses, shields and the like associated with automobile headlights. Among quite a number of patents may be mentioned U.S. Pat. Nos. 1,152,676, 1,464,860, 1,569,973, 2,438,196, and 2,904,672. The common thread among these various devices is the inclusion of a cell confining a liquid through which the headlight beam passes. This is asserted to be beneficial, e.g., in improving the efficiency of the headlights during fog conditions (see, e.g., U.S. Pat. No. 2,904,672.

Other references of secondary interest include U.S. Pat. Nos. 2,063,296 and 3,747,530. Neither adds particularly pertinent information over that in the other references noted above.

Although it is evident that there has been substantial activity in the development of fluid filter cells, including cells designed expressly for the filtration of infrared radiation from a broader spectrum, no one has yet to adapt those principles for the purpose of filtering infrared from aircraft lights in order to eliminate the lighting system as a tracking source for a heat-seeking missile. Rather, the art has focused on sophisticated ECM systems which, while extremely efficient, are developed and implemented only at equally significant expense.

SUMMARY OF THE INVENTION

The present invention advantageously merges the known concept of infrared radiation filtration by fluid media with a specific structural implementation adapting that concept for particular use in the suppression of unwanted infrared emitted by aircraft lights. The present invention is desirable not only from the point of view of its simplicity with parallel efficiency, it provides a solution to a serious problem which is cost-effective versus current approaches in the nature of ECM devices. Other important benefits of the present invention include the ability to retrofit existing aircraft to provide these advantages; and also, as a correlary to its implementation, effective cooling of the synthetic resin window panels associated with aircraft landing and taxi lights so that the lights may be used in situations heretofore prohibitive die to the danger of melting the resinous panels.

The foregoing, and other advantages and benefits of the present invention, are realized by an infrared radiation filter lens for aircraft lights comprising a heat-conductive filter frame disposed in heat-exchange relationship with the aircraft frame and/or skin in order to dissipate heat in the filter frame to the aircraft and also to the ambient; first and second window panels secured peripherally by the filter frame along longitudinal and transverse side edges in laterally spaced, generally conforming relationship defining a fluid cell therebetween for interposition outwardly proximate the aircraft lights in the light path thereof; a fluid, infrared radiation filtration medium disposed for convective circulation within the cell; and a baffle inwardly proximate each of the transverse side edges of the cell for deflecting convective circulation of the fluid along those edges. Within the instant context of utility, the lens further comprises an expansion chamber for regulating the fluid pressure within the cell during operational conditions.

In a particularly preferred embodiment, the filter frame includes a panel clip receiving the longitudinal and transverse edges of one of the window panels within a generally "U"-shaped clip member; and wherein the portion of the panel clip along the transverse edges includes an inwardly directed, generally "L"-shaped leg defining the baffle means. Alternately, strips of resilient polymer may be disposed proximate the transverse side edges and intermediate the longitudinal edges to provide the baffle. In either event, inlet and outlet ports allow for convective circulation of the fluid to transfer its heat to the frame which, in turn, dissipates the same to or through the aircraft structure.

The window panels are preferably synthetic resin panels such as polycarbonate or equivalent materials. The fluid filter medium of choice is water, most preferably including ethylene glycol in eutectic proportions. Infrared radiation emitted from the aircraft landing and/or taxi lights is partially filtered by the synthetic resin panels, but is principally filtered by the fluid within the interposed fluid cell. Concomitant heating of both the window panels and fluid gives rise to convective currents moving the fluid within and throughout the cell, whereby heat is effectively transferred to the heat-conductive frame and thence the aircraft itself. The baffles ensure intimate contact of the circulating fluid with the transverse side edges of the frame for further improvement in heat-transfer efficiency. The expansion chamber regulates pressure within the fluid cell over the range of altitudes expected for aircraft flight.

The foregoing and other advantages will become more apparent, and a fuller appreciation of the structure and mode of operation of the instant filter lens will gained, upon examination of the following detailed description of the invention, taken in conjunction with the figures of drawing, wherein:

BRIEF DESCRIPTION OF THE DRAWINGS

FIG. 3 is a sectional view through the wing structure and filter lens of the present invention;

FIG. 4 is a sectional view, taken substantially along the line 4—4 of FIG. 3, showing a preferred structure for a baffle within the fluid cell of the filter;

FIG. 5 is a sectional view, similar to FIG. 4, showing an alternate structure for a baffle;

FIG. 6 is a sectional view, taken substantially along the line 6—6 of FIG. 3 showing the expansion chamber for the fluid cell; and, FIG. 7 is a sectional view, similar to FIG. 6, showing an alternate structure for an expansion chamber useful in the present invention.

DETAILED DESCRIPTION OF THE INVENTION

Figure 1:
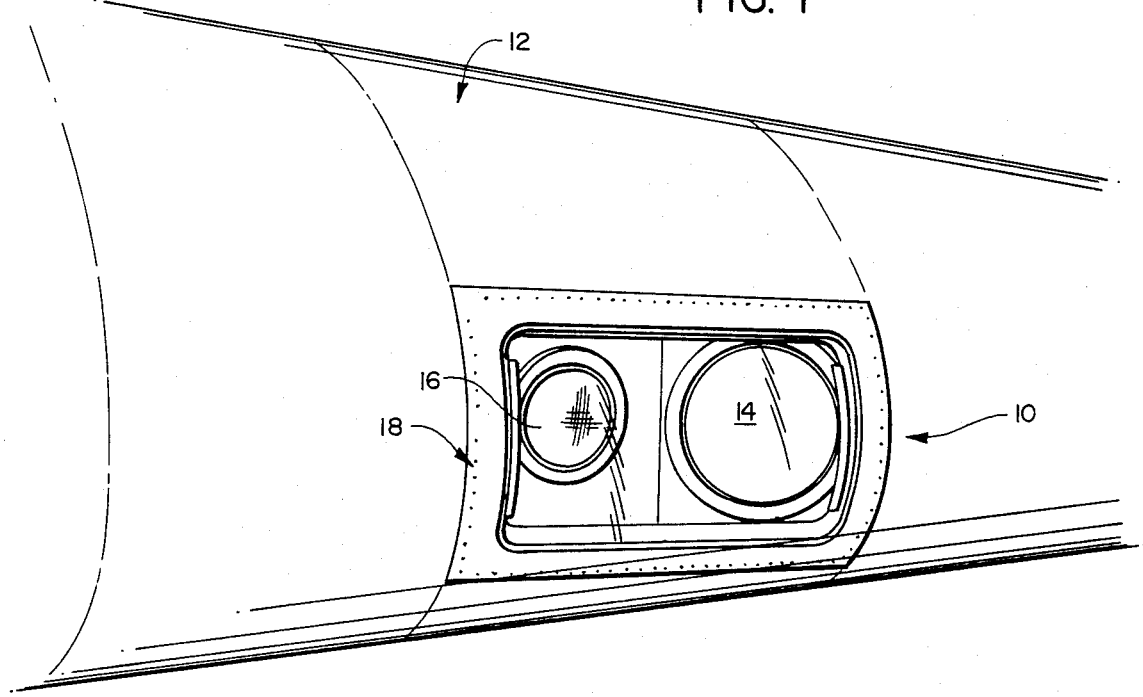
FIG. 1 is a perspective view of a segment of an aircraft wing showing the landing and taxi lights shielded by an infrared radiation filter lens in accordance with the present invention.

The present invention relates, generally, to infrared radiation filters and more particularly to such filters which employ a fluid filter medium for suppressing the infrared portion of the spectrum of light emitted from an incandescent lamp; with particular emphasis on the use of such filters for the elimination of infrared from aircraft taxi and landing lights. Accordingly, the invention will now be described with reference to certain preferred embodiments and alternate structural implementations specifically configured for this utility; although those skilled in the art will appreciate that such a description is meant to be exemplary only and should not be deemed limitative of the scope of the invention.

Turning to the figures of drawing, in each of which like parts are identified with like reference numerals, an infrared radiation filter lens in accordance with the present invention, designated generally as 10, is shown in an aircraft wing 12 enveloping the front of an aircraft landing light 14 and a taxi light 16. The lights 14 and 16 are usually very powerful lights; a typical landing light having a rating of on the order of 600,000 candle power and a typical taxi light on the order of 75,000 candle power. In order for these lights to function for their intended purposes it is essential that they have such high ratings; in turn, leading to significant output in the infrared portion of the spectrum and also a related, substantial heat output. In point of fact, when synthetic resin materials are used as the window panel for these lights, the heat output is great enough that aircraft, while stationary, can use the lights for only very short periods (less than 5 minutes) or risk damage to the window structure including melting therof. The filter lens 10 of the present invention eliminates virtually all of the infrared component in the spectrum of light emitted by the lights 14 and 16 and, as a further benefit of its structure, materially increases the length of time the lights may be used while the aircraft is stationary due to the efficiency of cooling.

The filter lens 10 is comprised of a frame, designated generally as 18, in heat-exchange relationship with the aircraft wing 12. As can best be seen with reference to FIGS. 3-5, the frame 18 is comprised of an outer clip 20 and an inner clip 22 formed from a metal having the characteristics of light weight and good heat conductivity, such as aluminum alloys. At the peripheral termination of the clips, a multi-thickness seam 24 is formed extending outwardly from the lens area as a bounding flange along the longitudinal and transverse edges of the lens, 26 and 28, respectively. This seam 24 facilitates the joining of the filter lens 10 to the aircraft structure; as shown in the figures of drawing, to the skin of the wing 12 via a doubler 30. In any event, the objective is to establish good heat exchange relationship between the frame 18 and the aircraft structure itself so that any heat transferred to the frame during operation of the lights 14 and/or 16 is dissipated throughout the body of the aircraft immediately surrounding the lens. Then too, the airstream of the aircraft or even simply the flow of air across the wings and lens during taxiing, will assist in the dissipation of heat as well.

The frame 18, and specifically the clip members 20 and 22, secure an inner window 32 and an outer window 34 in laterally spaced, generally conforming relationship to define therebetween a fluid cell 36. As best viewed in FIG. 3, the two windows 32 and 34 have a curved or arcuate geometry conforming to the skin of wing 12 as a continuous extension thereof in order to present a good aerodynamic surface. The two windows conform within this curved space to yield a cell 36 having a generally uniform depth dimension; a depth nominally on the order of about ½-¾ inch being quite adequate. In the preferred embodiment illustrated in FIG. 3, the outer window 34 and its retaining clip 20 may advantageously be the existing window structure in the aircraft. In this context, the window 34 is typically a synthetic resin window made from a material such as that marketed under the registered trademark "Plexiglas". That type of resinous material is a fairly good infrared absorber itself, so the panel aids in the objective of infrared radiation supression. However, it should be noted that a thickness considerably greater than conventional thicknesses implied for window panels is required for substantial infrared reduction and, thus, one could not reasonably rely simply on employing a thicker window panel for this purpose. It should also be appreciated that the absorption of infrared by the window substantially increases its internal temperature, compounding problems were one simply to increase thickness of that component. In this highly preferred, specific embodiment, the inner window 32 and its associated retaining clip 22 are added to the existing structure in order to define the closed fluid cell 36. In this case, the window material of choice for the panel 32 is a polycarbonate as it exhibits somewhat better heat resistance characteristics. However, these are not hard and fast requirements of the invention in order to achieve its beneficial results; and any conventional window composition (e.g., glass) may likewise be used to good advantage in the lens 10.

Looking more specifically to the structure of the panels 32 and 34 and their associated clips, the outer clip 20 is shown to include a generally "U"-shaped clip element 38 extending peripherally about the frame along the longitudinal and transverse edges. The "U" clip 38 receives the edges of the window 34, securing the same in position generally contiguous with the skin of wing 12. The inner clip 22 is a generally "Z"-shaped clip terminating in a window support leg 40 spaced laterally in generally parallel relationship with respect to the channel in the "U" clip element 38. The support leg 40 is provided with a window-sealing gasket material 42 about its inner side face, to which is bonded or otherwise secured the window 32 using conventional joining or assembly techniques. The structure of the clips 20 and 22 thus provide fluid integrity for cell 36, sealing the same effectively about the longitudinal and transverse edges of the filter.

Figure 2:
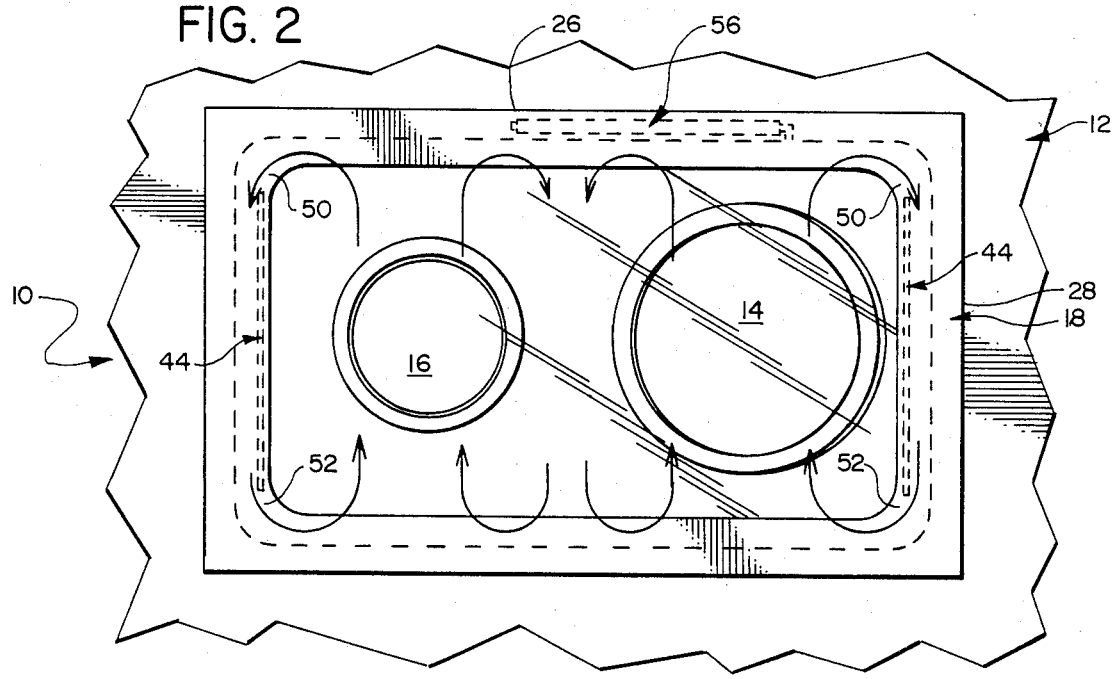
FIG. 2 is a fragmentary, front elevational view of the aircraft wing and filter lens assembly of Fig. 1, illustratively showing the convective current paths for fluid within the filter cell.

The most preferred fluid filter medium charged to the cell 36 is a eutectic mixture of water and denatured ethylene glycol. Thus, a mixture of about 35 parts water to 65 parts glycol yields a very efficient filter which suppresses virtually all of the infrared emitted by the lights 14 and/or 16 while guarding against freezing of the fluid. Other fluids might also be employed to good advantage, with due consideration for the environmental extremes to which aircraft are subjected while standing on the ground and in flight and also the ability to remove infrared selectively without substantial reduction in the intensity of the visible components. Irrespective of the specific composition, as the light beam passes through the filter 10 the fluid itself will become heated as infrared is removed and it is necessary to dissipate that heat. FIG. 2 illustrates generally the convective current paths of the heated fluid as it rises from the area proximate the lights into contact with the upper longitudinal edge 26 of the frame 18 and also circulates proximate the transverse edges 28 thereof. Baffle means, designated generally as 44 are included interiorly of the cell 36 for deflecting the convective path of that portion of circulating fluid along and in intimate contact with the transverse edges of the frame 18 in order to improve on heat transfer of the device.

FIGS. 3 and 4 illustrate a highly preferred structure for the baffle member 44. The outer clip 20 restraining window 34 in place either includes or is formed with a slightly overlength inner leg 46 comprising that portion of the clip element 38 along the transverse side edges 28 and intermediate the longitudinal edges 26; overlength at least as respects that length necessary for holding the panel securely. This extra portion 46 of the leg 38 is bent inwardly in the general form of an "L"-shaped member. The leg 46 thereby defines a flow channel 48 having an upper inlet port 50 and a lower exit port 52 for admission and egress of circulating fluid. The leg 46 preferably terminates slightly short of the surface of the window 32 since, because the clip is a metal member, it is desirable to avoid abrading contact between these components which might contribute to failure. However, this preferred structural arrangement offers the distinct advantage of ease of construction as the "U" leg of clip element 38 need merely be severed at appropriate locations along the transverse edges 28 and bent outwardly. Because of its metal construction, the baffle leg 46 provides yet another heat contact surface for transfer of heat from the circulating fluid within channel 48 to the frame and, thence, to the aircraft structure itself.

FIG. 5 shows an alternate embodiment for the baffle 44. In that structure a strip of a suitable polymer 54 is disposed between the two window panels 32 and 34, placed relative to the transverse and side edges at about the same location as the leg 46 and similarly defining a flow channel 48 having inlet and outlet ports 50 and 52 respectively. The advantage offered here by the polymeric strip 54 is the cushioning effect achieved by intimate contact between the windows; but the strip otherwise functions in the same manner as the baffle structure illustrated in FIGS. 3 and 4. Thus, comparing FIG. 2 with FIGS. 3-5, it can be seen that very good convective flow is provided through the channel 48 in contact with the metal frame members for achieving the aforenoted objective of dissipating heat generated within the filter to the aircraft and/or the ambient.

In flight, the fluid within the cell 36 will be subjected to widely varying pressure variations. Likewise, thermal expansion and contraction are to be anticipated as the lights are cycled on and off during the course of flight. It is relatively important to maintain the cell full of fluid at all times and also to guard against any excessive pressure. In a similar vein, it is important to maintain a good seal in order to prevent boiling (evaporation) of the fluid within the cell during high altitude (i.e., low pressure) flight conditions. Accordingly, an expansion chamber designated generally at 56 is provided to account for these variations. In one preferred embodiment, illustrated in FIGS. 3 and 6, the expansion chamber 56 is comprised simply of a resilient polymeric tube 58 having a plug 60 closing its distal end, sealing same against egress of fluid or ingress of air. The tube 58 is received on and sealed to a conduit 62 communicating with the fluid cell 36 along the top longitudinal edge 26. This structural arrangement is found to work very well and offers the further advantage of providing a convenient means for filling the cell and/or replenishing its contents as need be. FIG. 7 shows an alternate embodiment for an expansion chamber 56. Here a cylinder 64 is sealed on the conduit 62 by means of a sealing sleeve 66. The cylinder 64 includes a biased piston 68 operated by a piston spring 70 disposed within a closed end of the cylinder. As pressure variations occur, the volume of fluid in the head above the piston 68 will vary in response to the biasing force provided by spring 70. In either embodiment, the same function is achieved—the regulation of pressure within the fluid cell 36 during operation and over the range of environmental variation experienced during flight conditions.

In operation, the filter lens 10 of the present invention is highly efficient and extremely reliable. Virtually all of the infrared component in the light beam emitted by lamps 14 and/or 16 is removed. The heat generated during filtering is so efficiently removed by virtue of the structure of the cell and baffle members that the lights may be operated in situations heretofore impossible. For example, operation of the landing light on the ground while an aircraft is stationary has been limited to less than about 4–5 minutes where conventional synthetic resin materials are employed for the window panels. However, prototype testing of the lens 10 under simulated conditions allowed for *both* landing and taxi lights (having ratings of 600,000 and 75,000 candle power respectively) to be operated approximately 40 minutes at room temperature in the absence of any external cooling without approaching temperatures damaging to the window components. This is more than a simple incidental benefit achieved by the present invention; allowing for the use of aircraft lights for improved safety in situations where this was simply not possible in the past.

As is readily apparent from the foregoing, the filter lens of the present invention provides many substantial advantages. This is achieved in a very straightforward manner allowing for the savings of considerable expense where it is essential to protect aircraft against successful attack by heat-seeking missiles homing on landing and/or taxi lights; as opposed to the need to equip aircraft with very expensive and sophisticated ECM devices destined to accomplish the same role.

While the invention has now been described with reference to certain preferred and alternate embodiments, those skilled in the art will appreciate that various substitutions, changes, omissions and modifications may be made without departing from the spirit thereof. Accordingly, it is intended that the scope of the present invention be limited solely by that of the claims granted herein.

What is claimed is:

1. An infrared radiation filter lens for aircraft lights, comprising heat-conductive filter frame means configured for disposition in heat-exchange relationship with the structure of the aircraft proximate the location of said lights; first and second window panels secured peripherally by said filter frame means in laterally spaced, generally conforming relationship defining a fluid cell therebetween for interposition outwardly proximate said aircraft lights in the light path thereof; a fluid, infrared radiation filtration medium disposed for convective circulation within said cell; and baffle means inwardly proximate transverse side edges of said cell intermediate longitudinal top and bottom edges thereof for deflecting convective circulation of said fluid along and in contact with said side edges through flow channels having inlet and outlet ports defined by said baffle means; wherein said filter frame means includes a generally "U"-shaped clip element having inner and outer legs receiving one of said window panels therebetween, said inner leg being displaced laterally inwardly within said fluid cell along said transverse side edges intermediate said longitudinal edges to comprise said baffle means.

2. An infrared radiation filter lens for aircraft lights, comprising heat-conductive filter frame means configured for disposition in heat-exchange relationship with the structure of the aircraft proximate the location of said lights; first and second window panels secured peripherally by said filter frame means in laterally spaced, generally conforming relationship defining a fluid cell therebetween for interposition outwardly proximate said aircraft lights in the light path thereof; a fluid, infrared radiation filtration medium disposed for convective circulation within said cell; and baffle means comprised of a strip of a resilient material disposed inwardly proximate transverse side edges of said cell intermediate longitudinal top and bottom edges thereof for deflecting convective circulation of said fluid along and in contact with said side edges through flow channels having inlet and outlet ports defined by said baffle means.

* * * * *